Feb. 9, 1943.    J. A. BUCHANAN    2,310,213
ANGULAR CLASSIFYING ACCELEROMETER
Filed Nov. 1, 1941
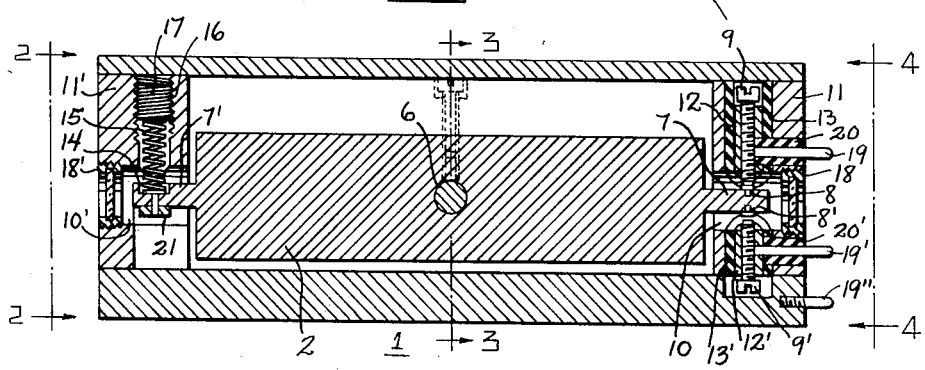
INVENTOR
James A. Buchanan
BY
ATTORNEY Patented Feb. 9, 1943

2,310,213

UNITED STATES PATENT OFFICE 2,310,213

ANGULAR CLASSIFYING ACCELEROMETER

James A. Buchanan, United States Navy

Application November 1, 1941, Serial No. 417,571

20 Claims. (Cl. 200—52)

(Granted under the act of March 3, 1883, as amended April 30, 1928; 370 O. G. 757)

My invention relates to accelerometers and in particular to angular accelerometers for classifying angular accelerations to which a moving body may be subjected. Angular acceleration is a vector quantity and may either be positive or negative with respect to a convenient axis of reference. Deceleration is a term sometimes applied to negative acceleration.

This invention has particular utility in its application to aircraft where angular accelerations of high order are often obtained. It is well known that the structural design of aircraft is directly related to forces acting thereupon when under accelerations. In view of the fact that the present trend in aircraft design is towards increasingly higher speeds, and therefore increasing values in accelerations which may run as high as 20 radians/sec.$^2$, it is therefore most necessary to obtain an accurate record of the accelerations attained.

By means of my invention I provide an accelerometer which when combined with any suitable detecting means such as for example the apparatus described in my co-pending patent application, Serial No. 417,375, filed October 31, 1941, will serve to classify angular acceleration as less than or greater than a predetermined value for which the particular accelerometer has been calibrated. By utilizing a battery of these accelerometers, each of which may be calibrated to respond to a different value of angular acceleration, in conjunction with such detecting means, I am therefore able to obtain an accurate record of the angular accelerations attained by any moving body.

It is therefore a broad object of my invention to provide an instrument for classifying angular accelerations as less than or greater than a predetermined calibrated value.

Another object is to provide an accelerometer for classifying angular accelerations which may be attached singly to objects, the acceleration characteristics of which are to be determined or readily assembled in preselected and quickly varied groups for such attachment.

A more specific object is to provide an accelerometer for classifying angular accelerations in which an acceleration sensitive member, pivotally supported for rotation about an axis through its center of mass and constituting one contact is movable rotationally in response to angular acceleration into and out of engagement with a stationary contact in accordance with the characteristics of angular acceleration imparted to the accelerometer.

Another specific object is to provide an accelerometer for classifying angular accelerations in which an acceleration sensitive member, pivotally supported for rotation about an axis through its center of mass to render it responsive to angular accelerations only and carrying a contact, is biased by a torque applied thereto to engage a complementary stationary contact under conditions of angular accelerations, the torque of which is less than the biasing torque, but movable away therefrom when the torque resulting from such acceleration exceeds said biasing torque.

Still another specific object of my invention is to provide an accelerometer for classifying angular accelerations in which an acceleration sensitive member, pivotally supported for rotation about an axis through its center of mass to render it responsive to angular accelerations only and carrying a contact is biased out of engagement with a complementary stationary contact by a torque applied thereto, but movable rotationally about its axis to engage said stationary contact when subjected to angular accelerations, the torque of which exceeds said biasing torque.

A further specific object is to provide an accelerometer for classifying angular accelerations in which an acceleration sensitive member, pivotally supported in such manner that it will be movable about said pivot only when subjected to angular accelerations, and carrying a contact, is biased to engage one complementary stationary contact under conditions of angular accelerations, the forces of which are less than said biasing force but which is movable about its pivot to engage an oppositely disposed second stationary contact when subjected to angular accelerations in which the forces resulting therefrom exceed said biasing force.

A further specific object is to provide an accelerometer for classifying angular accelerations in which an acceleration sensitive member, pivotally supported in such manner that it will be movable about said pivot only when subjected to angular accelerations, and carrying a contact, is biased to engage one complementary stationary contact under conditions of angular accelerations, the forces of which are less than said biasing force but which is movable about its pivot to engage an oppositely disposed second stationary contact when subjected to angular accelerations in which the forces resulting therefrom exceed said biasing force, each of said contacts being connected electrically to terminals forming one half of a plug-and-socket quick detachable connecting means in order that the accelerometer or a preselected group of them may be quickly connected in an assembly for association with suitable detecting means utilizing electric circuits in which said accelerometer contacts form elements thereof.

The foregoing and other objects of my invention will become apparent from the detailed description to follow and from the accompanying drawing in which:

Fig. 1 is a vertical section of a preferred embodiment of my invention;

Fig. 2 is an end view from lines 2—2 on Fig. 1;

Fig. 3 is a transverse section taken on lines 3—3 of Fig. 1, and

Fig. 4 is an end view from lines 4—4 on Fig. 1.

Referring now to the drawing, a casing 1 which is preferably made from a metal to give rigidity to the structure is provided for pivotally supporting therein an acceleration responsive member 2. In order that the acceleration member 2 may respond only to angular accelerations, it is necessary to so support the member that should it be subjected to any linear accelerations, all forces tending to produce rotation of the member about its pivot will be neutralized. Or, stated mathematically, when subjected to purely linear acceleration, the summation of moments about the pivotal axis resulting from the reversed effective forces acting at each element of mass of member 2 must be equal to zero. This is accomplished by pivotally supporting the acceleration responsive member for rotation about an axis through its center of mass.

In my preferred embodiment, member 2 is formed symmetrically from a homogeneous material and hence it will be evident that the center of mass is coincident with its geometrical center. A pair of pivots 3—3' having male threads formed thereon are screwed into corresponding female threaded openings 4—4' provided in the side walls 5—5' of casing 1 and engage member 2 in a pivotal support by means of pivot bearing 6 provided in member 2 centered on a transverse axis through the center of mass thereof. Pivots 3—3' may be maintained in their position by means of screws 22—22'.

Member 2 is provided with an outwardly extending arm portion 7 at one end thereof. This arm portion carries oppositely disposed contacts 8—8' and is arranged for movement between stationary contact screws 9—9' in an aperture 10 formed in one end wall 11 of casing 1. Suitable female threaded bushings 12—12' each of which is electrically insulated from the end wall of the casing by insulating sleeves 13—13' and opening into the aperture 10 receive the contact screws 9—9'.

At the opposite end of member 2, a similar outwardly extending arm 7' is provided and has an annular seat 14 formed in the top surface to receive a coil spring 15. Arm 7' extends into an aperture 10' provided in the opposite end wall 11' and spring member 15 is guided in a suitable opening 16 in end wall 11' connecting with the aperture 10'. The opening 16' may be threaded for receiving a plug member 17 for adjusting the compression of coil spring 15. In order that arm members 7—7' may be of equal effective mass, a protuberance 21 is formed on the lower surface of arm 7'. Taking into consideration that portion of the mass of the spring effective as if it were a part of the pivoted member 2, this protuberance is of such mass as to compensate for the loss of mass in forming spring seat 14 in arm 7' and the slight additional mass added to arm 7 by contacts 8—8'.

Plug members 18—18', each of which may include a transparent central section in order that one may readily check the condition of the contacts 8—8' and 9—9' and also the condition of coil spring 15 may be provided and are respectively threaded into apertures 10 and 10'.

So that a plurality of my angular classifying accelerometers, each of which would be calibrated to respond to a different degree of angular acceleration such as for example—steps of 1 radian/sec$^2$, may be quickly housed in any assembly similar in principle to the housing shown in my co-pending patent application, Serial No. 413,476, filed October 3, 1941, I provide plug terminals 19, 19' and 19''. Terminals 19—19' are electrically insulated from the end wall 11 by insulating sleeves 20 and 20' and make contact respectively with contact screws 9—9'. Since member 2, its pivotal supporting means 3—3' and casing 1 are, in the present embodiment of my invention, preferably made of metal which is a good electrical conductor, terminal 19'' when threaded into the base of casing 1 will be "electrically" connected to the movable contacts 8 and 8'.

If casing 1 were to be made of non-conducting material, it will be evident that none of the aforesaid insulation sleeves would need to be provided. In such event, however, contacts 8—8' would be electrically connected, such as by a flexible conductor therefrom or by a suitable connection to the pivots 3—3' with plug terminal 19''.

It will be evident that the housing provided for the assembly of a group of my accelerometers would be provided with complementary socket members for receiving plug-in terminals 19, 19' and 19''. It will likewise be evident that the plug-in terminals 19, 19' and 19'' may be replaced with socket members in which case the housing would be provided with the complementary plug-in members.

*Operation*

My angular classifying accelerometer operates in the following manner. Spring member 15 is placed in compression by screwing plug member 17 downwardly against the top thereof. Spring 15 when thus compressed exerts a force F upon the arm 7' of member 2 which tends to rotate member 2 about its pivotal support P in a counter-clockwise direction with a torque Q equal to F multiplied by its lever arm distance $l$ from the pivot P. This tendency to rotate is resisted, however, due to contact between movable contact member 8 and stationary contact member 9 on the casing 1.

As heretofore explained, should the casing 1 and acceleration responsive member 2 be subjected to a linear acceleration, there will be no forces tending to produce rotation of member 2. However, if an angular acceleration is applied to the casing 1 tending to produce rotation in a counter-clockwise direction as indicated by the arrow, the balanced acceleration sensitive member 2 will follow the rotation of the casing 1 so long as the torque $Fl$ is greater than the couple or torque M, created by angular acceleration of member 2, which in turn is equal to the mass moment of inertia I of member 2 multiplied by the acceleration.

When the forcing acceleration increases to such value that M is in excess of $Fl$, the balanced member 2 will rotate relatively in an opposite direction to that of casing 1, breaking the contact between movable contact 8 and stationary contact 8 and closing the contact between contact members 8' and 9' after traversing the relatively minute gap between contact members 8' and 9'.

Suitable detecting means, such as for example the recorder described in the aforesaid application Serial No. 417,375, filed October 31, 1941, or the audio detector described in my co-pending patent application, Serial No. 372,805, filed January 2, 1941, now Patent No. 2,283,180, granted May 19, 1942, may be used in conjunction with the accelerometer to indicate whether or not the forcing acceleration was less than or greater than the acceleration value defined by the term $$\frac{Fl}{I}$$

In measuring accelerations, it is frequently the case that a basic forcing angular acceleration to be measured will be accompanied by parasitic oscillatory vibrations of relatively higher frequencies. Such parasitics have relatively small oscillation amplitudes as compared with the basic forcing angular amplitude and may be negligible. When parasitics are so negligible as to be disregarded, the accelerometer will be connected by plug-in members 19 and 19" to the detecting means, in which case the electric circuit in the detecting means would utilize in the control therefor the "break" between contact members 8 and 9. However, when the characteristics of the parasitics are such as to cause "chattering" between movable contact 8 and stationary contact 9 as the forcing acceleration approaches the critical value at which member 2 will be caused to rotate, the accelerometer will be connected by plug-in members 19' and 19" to the detecting means, in which case the electric circuit in the detecting means would utilize in its control the "make" between contact members 8' and 9'.

Although in my preferred embodiment, the force F applied to member 2 to obtain a torque Fl is derived from coil spring 15, it will be evident that other torque producing means may be used equally as well. A torsion spring acting in such manner as to tend to produce rotation of said member, or a fluid pressure acting thereon at a lever arm distance from its pivot are a few examples of such alternatively usable torque producing means.

It will be understood that the foregoing structure described is representative of only one embodiment of my invention and that various changes and modifications may readily occur to those skilled in the art without departing from the spirit and scope thereof.

This invention may be manufactured and used by or for the Government of the United States of America for governmental purposes without the payment of any royalties thereon or therefor.

Having now fully described my invention, what I claim is:

1. An angular classifying accelerometer comprising a support, an acceleration sensitive member having a contact carried thereby, a stationary contact carried by said support, means for pivotally supporting said member on said support in such manner that should said member be subjected to linear acceleration the algebraic sum of all moments resulting therefrom about said pivot would be equal to zero, means for applying a torque to urge said member rotationally about its pivotal support, said torque being sufficient to effect engagement between the contact on said acceleration sensitive member and said stationary contact only for such time as the angular acceleration to which said member may be subjected is less than a predetermined magnitude, and means for varying said torque.

2. An angular classifying accelerometer comprising a support, an acceleration sensitive member having a contact carried thereby, a complementary stationary contact carried by said support, means for pivotally supporting said member on said support in such manner that should said member be subjected to linear acceleration the algebraic sum of all moments resulting therefrom about said pivot would be equal to zero, means for applying a torque to urge said member rotationally about its pivotal support, said torque being sufficient to maintain a gap between said contacts when the angular acceleration applied to said accelerometer is less than a predetermined magnitude but permitting said acceleration sensitive member to move across said gap to effect a closure of said contacts when angular acceleration of said accelerometer exceeds such predetermined magnitude and means for varying said torque.

3. An angular classifying accelerometer comprising a support, a pair of stationary contacts carried by said support and disposed in juxtaposed relation, an acceleration responsive member constituting a complementary movable contact, means for supporting said acceleration responsive member on said support for rotation about an axis through its center of mass to thereby render said member responsive to angular acceleration only and means for biasing said member to effect engagement with the first of said pair of stationary contacts under conditions of angular acceleration less than a preselected value, said member being rotatable about said axis to move out of engagement with said first stationary contact and into engagement with said second stationary contact when subjected to an angular acceleration in excess of said preselected value.

4. An angular classifying accelerometer comprising a support, a pair of stationary contacts carried by said support and disposed in juxtaposed relation, an acceleration responsive member constituting a complementary movable contact, means for supporting said acceleration responsive member on said support for rotation about an axis through its center of mass to thereby render said member responsive to angular acceleration only, means for biasing said member to effect engagement with the first of said pair of stationary contacts under conditions of angular acceleration less than a preselected value, said member being rotatable about said axis to move out of engagement with said first stationary contact and into engagement with said second stationary contact when subjected to an angular acceleration in excess of said preselected value, and adjusting means cooperating with said biasing means whereby said acceleration member may be set to respond to any one of a plurality of values of angular acceleration.

5. An angular classifying accelerometer comprising a support, a pair of stationary contacts carried by said support and disposed in juxtaposed relation, an acceleration responsive member constituting a complementary movable contact, means for supporting said acceleration responsive member on said support for rotation about an axis through its center of mass to thereby render said member responsive to angular acceleration only, means for biasing said member to effect engagement with the first of said pair of stationary contacts under conditions of angular acceleration less than a preselected value, said member being rotatable about said axis to move out of engagement with said first stationary contact and into engagement with said second stationary contact when subjected to an angular acceleration in excess of said preselected value, and means for electrically connecting each of said contacts to terminals forming one half of a detachable connector whereby said accelerometer may be quickly connected for association with accelerometer detecting means utilizing electric circuits in which said accelerometer contacts form elements thereof.

6. An angular classifying accelerometer comprising a support, a pair of stationary contacts carried by said support and disposed in juxtaposed relation, an acceleration sensitive member constituting a complementary movable contact, means for pivotally supporting said acceleration member on said support for rotation thereof about an axis through its center of mass to thereby render said member sensitive to angular acceleration only and means for applying a force to said member on one side of said pivotal supporting means to bias the other side of said member into engagement with one of said pair of stationary contacts under conditions of angular accelerations having less than a predetermined critical value, said member being rotatable about said axis into engagement with the oppositely disposed stationary contact when subjected to angular accelerations, the forces of which exceed said biasing force.

7. An angular classifying accelerometer comprising a casing having an opening formed through one wall thereof, a pair of stationary contacts disposed in said casing wall and extending into said opening in juxtaposed relation, an acceleration responsive member, means for supporting said member for rotation thereof within said casing about an axis through the center of mass of said member, one end of said member being disposed for movement between said contacts, and means for biasing said member end into engagement with one of said contacts under conditions of less than a predetermined critical angular acceleration, said member being rotatable about said axis to bring said end thereof into engagement with the oppositely disposed contact when angular acceleration of said member exceeds said predetermined critical value.

8. The combination in claim 7 and including means for varying the degree of bias on said acceleration responsive member to permit rotation of said acceleration member upon being subjected to any one of a plurality of values of angular acceleration.

9. An angular classifying accelerometer comprising a casing having an aperture formed therein, a pair of stationary contacts disposed in said casing and extending into said aperture in juxtaposed relation, an acceleration responsive member, means for pivotally supporting said acceleration member for rotation about an axis through its center of mass to thereby render said member sensitive to angular acceleration only, means for applying a force to said acceleration member on one side of said pivotal supporting means to bias the other side thereof into engagement with one of said pair of stationary contacts when angular acceleration thereof is less than a predetermined critical value, said acceleration member being rotatable about said axis into engagement with the oppositely disposed stationary contact when subjected to any angular acceleration, the force of which exceeds said biasing force.

10. The combination in claim 9 and including means for adjusting the position of said stationary contacts with respect to the end of the acceleration member movable therebetween and further including means for varying said biasing means to permit response of said acceleration member throughout a plurality of values of angular acceleration.

11. An angular classifying accelerometer comprising a casing having an aperture formed through one wall thereof, a pair of stationary screw contacts disposed in said casing wall and extending into said aperture in juxtaposed relation, an acceleration sensitive member having contact means carried thereby for operation between said screw contacts, means for supporting said acceleration member for rotation about an axis through its center of mass to thereby render said member responsive solely to angular acceleration, means for applying a force to said acceleration member to urge the contact means carried thereby into engagement with one of said pair of screw contacts when angular acceleration applied to said accelerometer is less than a predetermined value, said acceleration sensitive member being rotatable to engage the oppositely disposed contact when subjected to angular acceleration exceeding said predetermined value and quick detachable connector means electrically connected to each of said contacts respectively whereby said accelerometer may be quickly connected to accelerometer detecting means utilizing an electric circuit in which at least one of said screw contacts and the contact carried by said acceleration member form elements thereof.

12. An angular classifying accelerometer comprising a casing having an aperture formed through one wall thereof, a pair of stationary contacts disposed in said casing wall and extending into said aperture in juxtaposed relation, an acceleration responsive member having an outwardly extending portion formed at each end thereof, one of said extended portions including a spring seat and the other of said extended portions including contact means for operation between said stationary contacts, means for pivotally supporting said acceleration responsive member intermediate said extended portions for rotation thereof about an axis through its center of mass to thereby render said acceleration member sensitive to angular accelerations only, a coil spring member, one end thereof being received in said spring seat, means for compressing said spring to apply a biasing force to one end of said acceleration member to thereby urge the contact carried by the opposite extension thereof into engagement with one of said stationary contacts when forces of angular acceleration to which said acceleration member may be subjected are less than said biasing force, said acceleration member and contact being caused to rotate to effect engagement with the oppositely disposed stationary contact when the forces of angular acceleration exceed such biasing force, means for varying the compression of said coil spring to thereby vary the value of acceleration to which said acceleration member will respond and quick detachable connector means electrically connected to each of said contacts whereby said accelerometer may be quickly connected to detecting means therefor utilizing an electric circuit in which at least one of said stationary contacts and the contact carried by said acceleration member form elements thereof.

13. A classifying angular accelerometer comprising a frame member, a balanced member insensitive to linear acceleration pivotally supported by said frame member, a stationary contact member supported by said frame member, a movable contact supported by said balanced member, means for applying a biasing torque between said frame member and said balanced member whereby said contacts are maintained in engagement when said accelerometer is subjected to forcing angular acceleration of less than a predetermined magnitude and are sensitively separable when said accelerometer is subjected to forcing acceleration of greater than said predetermined magnitude.

14. A classifying angular accelerometer comprising a frame member, a balanced member insensitive to linear ecceleration pivotally supported by said frame member, a stationary contact member supported by said frame member, a movable contact supported by said balanced member, means for applying a biasing torque between said frame member and said balanced member whereby said contacts are maintained out of engagement when said accelerator is subjected to forcing angular acceleration of less than a predetermined magnitude and are sensitively engageable when said accelerometer is subjected to forcing acceleration of greater than said predetermined magnitude.

15. A classifying angular accelerometer comprising a frame member, a pair of stationary contact members supported by said frame member, a balanced member insensitive to linear acceleration pivotally supported by said frame member, said balanced member constituting a movable contact member cooperative with said stationary contact members, and means for applying a critical biasing torque whereby said balanced member is in contact with one or the other of said contact members according to whether a forcing angular acceleration applied to said accelerometer is less than or greater than critical magnitudes determined by said biasing torque.

16. A classifying angular accelerometer comprising a frame member, a pair of stationary contact members supported by said frame member, a movable member pivotally supported by said frame member and rotatable in said frame within limits defined by said stationary contact members, said movable member being so balanced about its pivotal support as to remain stationary with respect to said frame when subjected to forces due to purely linear acceleration, said movable member constituting a movable contact member cooperative with said stationary contact members, and means for applying a critical biasing torque whereby said movable member is in contact with one or the other of said contact members according to whether a forcing angular acceleration applied to said accelerometer is less than or greater than critical magnitudes determined by said biasing torque.

17. An accelerometer unit for classifying angular acceleration as less than or greater than a pre-determined magnitude comprising a support, a stationary contact carried by said support, an acceleration responsive member constituting a complementary movable contact, means carried by said support for pivotally supporting said acceleration responsive member for rotation on an axis through its center of mass to thereby render said member responsive solely to angular acceleration, and means for biasing said member towards engagement with said stationary contact, said biasing means being preset to maintain said member engaged with said stationary contact under conditions of angular acceleration less than said pre-determined magnitude, but permitting said member to be rotated on its axis when angular acceleration exceeds said pre-determined magnitude to break its engagement with said stationary contact.

18. The combination in claim 17, wherein said biasing means is offset from the pivotal support therefor.

19. An accelerometer unit for classifying angular acceleration as less than or greater than a pre-determined magnitude comprising a support, a stationary contact carried by said support, an acceleration responsive member constituting a complementary movable contact, means carried by said support for pivotally supporting said acceleration responsive member for rotation on an axis through its center of mass to thereby render said member responsive solely to angular acceleration, and means for biasing said member relative to said stationary contact, said biasing means being preset to maintain said member out of engagement with said stationary contact under conditions of angular acceleration less than said pre-determined magnitude, but permitting said member to be rotated on its axis when angular acceleration exceeds said pre-determined magnitude to effect engagement with said stationary contact.

20. The combination in claim 19, wherein said biasing means is offset from the pivotal support therefor.

JAMES A. BUCHANAN.